Dec. 23, 1958 W. P. BIGLER ET AL 2,865,492
FLIGHT MOUNTING FOR CHAIN CONVEYOR
Filed Nov. 30, 1954

INVENTORS
WILLIAM P. BIGLER
BY JOSEPH G. BIGLER
Hudson, Boughton,
Williams, David & Hoffmann
ATTORNEYS

2,865,492

FLIGHT MOUNTING FOR CHAIN CONVEYOR

William P. Bigler, Chagrin Falls, and Joseph G. Bigler, Willoughby, Ohio

Application November 30, 1954, Serial No. 472,106

1 Claim. (Cl. 198—176)

This invention relates to improvements in flight mountings for chain conveyors, that is mountings for conveyor flights which project laterally outward from the chain. In a chain conveyor of the type indicated it is highly desirable that at intervals throughout the length of the chain pairs of flights extend laterally in both directions, that the flights of each pair be rigidly connected together and that they be oscillatably connected to adjacent chain elements, so that the chain will be adapted to follow a curved course around the sprocket wheels supporting and driving the chain.

One of the objects of the invention therefore is the provision of a flight mounting such that transversely aligned flights will be rigidly connected together but will be capable of following a curved path where necessary.

Another object is the provision of a mounting which will be strong and secure.

Another object is the provision of a mounting which will utilize pivot pins of constant diameter throughout their length, which may be economically produced and which possess no sharp angular shoulders that would promote fracture.

Another object is the provision of fastenings between the pivot pins and the flight bases which lend themselves to quick disassembly by drilling out the plug welds.

Another object is the provision of a mounting such that the ends of the pivots do not extend beyond the bases of the flights and have no nuts or other attachments which interfere with the provision of desired contours in the flights.

Other objects and features of novelty will appear as we proceed with the description of that embodiment of the invention which, for the purposes of the present application, we have illustrated in the accompanying drawing, in which—

Figure 1:
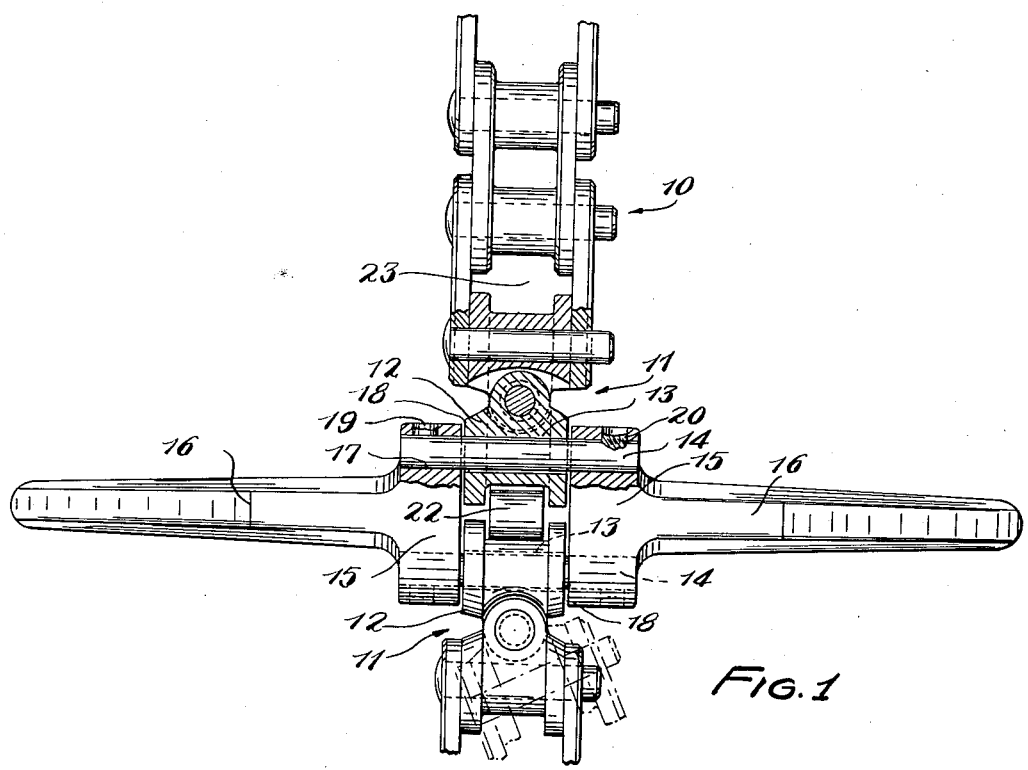
Fig. 1 is a fragmentary plan view of a conveyor chain with attached flights, the view being partially in horizontal section to better illustrate the invention.
Figure 3:
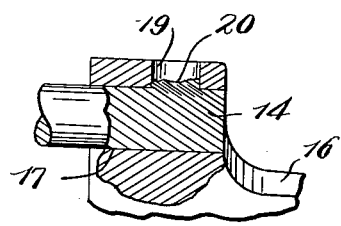
Fig. 3 is a fragmentary view partially in section illustrating on a larger scale the plug weld connection between a pivot pin and a flight base.

Fig. 1 of the drawing illustrates a conveyor chain 10 such as would be adapted to travel upon a flat surface and over sprockets at the ends of the conveyor. The chain as shown comprises universal units 11 which permit it to take a course departing more or less from a straight line, although the inclusion of such universal units constitutes no part of the present invention. In the adjacent elements 12 of consecutive universal units of the chain are drilled cylindrical holes 13 in which are journaled pivot pins 14. These pins extend laterally outward beyond the chain in both directions.

The bases 15 of each pair of flights 16 have bores 17 for the reception of the projecting ends of the pins 14, and serve in place of chain links. The pins 14 may have a press fit within the holes 17 in the bases 15, but while the pins and bases are being thus connected together a clearance 18 is maintained so that there will be no appreciable friction between the bases 15 and the sides of the universal elements 12.

Bores 19 are drilled through the bases 15 intercepting the bores 17. These intercepting bores 19 are for the purpose of taking what we term "plug welds." These welds might also be called "shear key type welds." They are formed by known welding procedure involving the addition of metal from welding rods. This procedure produces plugs or keys 20 which, by the welding process are made integral with the pins 14 and extend outwardly into the bores 19. The press fit of the pins 14 within the holes 17 in the bases 15 of course joins those parts quite firmly together, but the plugs or keys 20 add materially to the strength of the joint, especially since they prevent the start of any loosening action such as might tend to occur after considerable use of the conveyor.

The two joint elements 12 are spaced apart by the flight bases 15 the proper distance to receive between them a tooth 22 of a sprocket wheel over which the chain runs. The chain of course has similar spaces disposed at intervals along its length to receive sprocket teeth, one such space being shown at 23 in Fig. 1 of the drawing.

Figure 4:
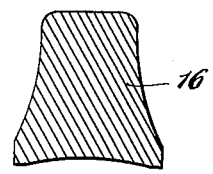
Fig. 4 is a transverse section taken substantially on line 4—4 of Fig. 2 but on a larger scale.
Figure 2:
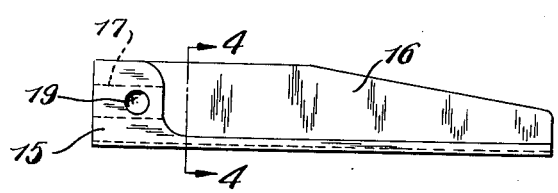
Fig. 2 is an elevational view of one of the flights.

From the cross section of Fig. 4 it will be observed that the side walls of each flight are formed with smooth continuous contours sloping upwardly and inwardly to the top of the flight. These sloping contours begin at the outer surfaces of the base and extend preferably to the free ends of the flights. Because the fastenings between the pins and the flights do not extend outwardly beyond the bases the contours of the flights may be designed without regard to the ends of the pins or any fastening means surrounding their ends, and thus may be shaped to provide strength and at the same time freedom from reentrant surfaces such as might catch and hold large lumps of bulk material.

The construction has certain important advantages. Each pin 14 stands preferably flush with the outer surface of the base 15 or else behind that surface. Hence there is no protrusion, such as a nut or weld, which might intereferre with designing the flight in such a way as to best perform its intended function. Secondly, it is relatively easy to disassemble the flights and pins in case replacement becomes necessary, since the plug or key 20 may be quickly removed by drilling it out with a drill of the same diameter as the bore 19.

Having thus described our invention, we claim:

In a conveyor chain for pushing bulk material over a flat surface, said chain having a pair of universal joints, the adjacent elements of which are spaced apart lengthwise of the chain to receive a sprocket tooth between them, each of said elements having transverse cylindrical bores, transverse pins journaled in said bores and projecting laterally therefrom in both directions, a flight with an integral base disposed on each side of and bridging the space between said elements, the integral base of each of said flights having bores receiving and wholly containing the projecting ends of said pins and comprising means entirely within the bases and accessible from the outside of the bases for locking the pins against movement in the bores, said flights having smooth side contours extending continuously from their bases to their outer ends and sloping upwardly and inwardly toward the tops of the flights, whereby the flights on opposite sides of the chain are rigidly connected and spaced by said pins and whereby the bulk material moved by the conveyor is freed to ride up over a flight to avoid jamming.

(References on following page)

References Cited in the file of this patent

UNITED STATES PATENTS

| | | |
|---|---|---|
| 1,917,134 | Levin | July 4, 1933 |
| 1,936,498 | Corbett | Nov. 21, 1933 |
| 2,226,989 | Young | Dec. 31, 1940 |
| 2,381,108 | Cartlidge | Aug. 7, 1945 |
| 2,450,501 | Clarkson | Oct. 5, 1948 |
| 2,469,524 | Simmons | May 10, 1949 |
| 2,684,236 | Fulke | July 20, 1954 |
| 2,756,867 | Russell et al. | July 31, 1956 |
| 2,756,868 | Russell | July 31, 1956 |

UNITED STATES PATENT OFFICE
CERTIFICATE OF CORRECTION

Patent No. 2,865,492                                          December 23, 1958

William P. Bigler et al

It is hereby certified that error appears in the printed specification of the above numbered patent requiring correction and that the said Letters Patent should read as corrected below.

Column 2, line 70, for "conveyor is freed" read -- conveyor is free --.

Signed and sealed this 19th day of May 1959.

(SEAL)
Attest:

KARL H. AXLINE
Attesting Officer

ROBERT C. WATSON
Commissioner of Patents